(12) United States Patent
Li (10) Patent No.: US 8,879,653 B2
(45) Date of Patent: Nov. 4, 2014

(54) SOFT-DEMAPPING OF QAM SIGNALS

(75) Inventor: Yunxin Li, Vaucluse (AU)

(73) Assignee: Nitero Pty Limited, Fitzroy (AU)

( * ) Notice: Subject to any disclaimer, the term of this patent is extended or adjusted under 35 U.S.C. 154(b) by 362 days.

(21) Appl. No.: 13/384,932

(22) PCT Filed: Aug. 6, 2010

(86) PCT No.: PCT/AU2010/000996

§ 371 (c)(1),
(2), (4) Date: Feb. 15, 2012

(87) PCT Pub. No.: WO2011/014926

PCT Pub. Date: Feb. 10, 2011

(65) Prior Publication Data

US 2012/0134452 A1    May 31, 2012

(30) Foreign Application Priority Data

Aug. 7, 2009 (AU) ................................. 2009903716

(51) Int. Cl.
| | |
|---|---|
| *H04L 27/22* | (2006.01) |
| *H04L 27/38* | (2006.01) |
| *H04L 27/34* | (2006.01) |
| *H04L 25/06* | (2006.01) |
| *H04L 25/02* | (2006.01) |
| *H04L 25/03* | (2006.01) |
| *H04L 27/26* | (2006.01) |

(52) U.S. Cl.
CPC ........... *H04L 25/067* (2013.01); *H04L 25/0228* (2013.01); *H04L 27/3433* (2013.01); *H04L 25/03159* (2013.01); *H04L 27/2655* (2013.01)
USPC ............ 375/261; 375/324; 375/329; 375/340

(58) Field of Classification Search
CPC ... H04L 1/0045; H04L 1/0054; H04L 25/067; H04L 27/22; H04L 27/2647; H04L 27/34; H04L 27/3433; H04L 27/38
USPC .......... 375/260, 261, 320, 322, 324, 329, 340
See application file for complete search history.

(56) References Cited

U.S. PATENT DOCUMENTS

| | | |
|---|---|---|
| 6,282,168 B1 | 8/2001 | Vijayan et al. |
| 6,594,318 B1 | 7/2003 | Sindhushayana |

(Continued)

FOREIGN PATENT DOCUMENTS

| | | |
|---|---|---|
| CA | 2 373 543 | 9/2002 |
| EP | 0 987 863 | 3/2000 |

(Continued)

OTHER PUBLICATIONS

T. Pollet, M.V. et al, "BER Sensitivity of OFDM Systems to Carrier Frequency Offset and Wiener Phase Noise" IEEE Trans. Communications; vol. 43, No. 2/3/4/ Feb./Mar./Apr. 1995.

(Continued)

*Primary Examiner* — David B. Lugo
(74) *Attorney, Agent, or Firm* — Hickman Palermo Truong Becker Bingham Wong LLP (57) ABSTRACT

This invention concerns soft-decision demapping of Quadrature Amplitude Modulation (QAM) signals to enable soft-decision channel decoding in a communications system. In a first aspect the invention is a method for performing the soft-decision demapping of Quadrature Amplitude Modulation (QAM) signals to enable soft-decision channel decoding in a communications system. The method comprises the steps of Extracting baseband signals from both I-and-Q channels. Sampling the baseband signals to extract a stream of complex numbers. Converting the stream of complex numbers to frequency domain vectors with components for each subcarrier frequency. Approximating bit log-likelihood ratios for each symbol directly from the real and imaginary parts of the corresponding frequency vector, without equalization by the estimated channel. And, soft-decoding of the channel codes using the approximated log-likelihood ratios. In other aspects the invention concerns a device for performing the method and software for performing the method.

5 Claims, 4 Drawing Sheets

(56) References Cited

U.S. PATENT DOCUMENTS

| | | | |
|---|---|---|---|
| 2004/0091058 A1 | 5/2004 | Tosato et al. | |
| 2004/0181744 A1 | 9/2004 | Sindhushayana | |
| 2005/0220203 A1 | 10/2005 | Ojard | |
| 2006/0023802 A1* | 2/2006 | Balakrishnan et al. | 375/265 |
| 2007/0127605 A1 | 6/2007 | Sindhushayana | |
| 2008/0291888 A1* | 11/2008 | Maret et al. | 370/342 |
| 2009/0279421 A1* | 11/2009 | Wang et al. | 370/210 |

FOREIGN PATENT DOCUMENTS

| | | |
|---|---|---|
| FI | 20021864 | 4/2003 |
| GB | 2 382 010 | 10/2002 |
| GB | 2 388 760 | 5/2003 |
| WO | 98/58496 | 12/1998 |
| WO | 01/67617 | 9/2001 |
| WO | 2006/095061 | 9/2006 |
| WO | 2008/131156 | 10/2008 |

OTHER PUBLICATIONS

C. Chang et al. "A Systematic Bit-Wise Decomposition of M-ary Symbol Metric", IEEE Trans. Wireless Commun. vol. 5., No. 10; pp. 2742-2750; Oct. 2006.

M. Ammari et al. "TCOFDM Symbols detection: joint channel estimation and decoding" IEEE International Conf. on Communications., No. 1 pp. 852-856; Jun. 2004.

F. Tosato et al. Simplified soft-output demapper for binary interleaved COFDM with application to HIPERLAN/2, IEEE International Conf. on communication., vol. 2, pp. 664-668, Apr./May 2002.

M. Wang et al. "Soft decision metric generation for QAM with channel estimation error" IEEE Trans. Communication., vol. 50, No. 7, pp. 1058-1061, Jul. 2002.

A. Natalin et al. "The method of Theoretic Estimation of BER of ML Received for Binary Coded Systems with Square QAM", IEEE International Conf. on Communication,. No. 1, pp. 1192-1197, Jun. 2006.

K. Kim et al. "General-Log Likelihood Ratio Expression and Its Implementation Algorithm for Gray-Coded Qam Signals" ETRO Journal, vol. 28, No. 3, pp. 291-300, Jun. 2006.

L. Szczecinski et al. "Probability Density Function of Reliability Metrics in BICM with Arbitrary Modulation: Closed-form Through Algorithmic Approach", IEEE Trans. Commun., vol. 56, No. 5 pp. 736-742, May 2008.

M. Raju et al. "BER Analysis of QAM on Fading Channels with Transmit Diversity", IEEE Trans. Wireless Commun., vol. 5, No. 3; pp. 481-486, Mar. 2006.

M. Simon et al. "On the Optimality of Bit Detection of Certain Digital Modulations", IEEE Trans. Commun., vol. 53, No. 2, pp. 299-307, Feb. 2005.

G. Caire et al. "Bit-Interleaved Coded Modulation" IEEE Trans. Information Theory, vol. 44, No. 3, pp. 927-946, May 1998.

T. May et al. "Performance Analysis of Viterbi Decoding for 63-DAPSK and 64-QAM Modulated OFDM Signals", IEEE Trans. Commun., vol. 46; pp. 182-190. Feb. 1998.

International Search Report, PCT/AU2010/000996; completion date Sep. 9, 2012; 4 pgs.

Written Opinion, PCT/AU2010/000996; completion date Sep. 9, 2012; 5 pgs.

Y. Li et al. "Orthogonal Frequency Division Multiplexing for Wireless Communications", Springer 2006.

J. Proakis, "Digital Communications" 4th Edition, McGraw-Hill, 2001.

S. Lin et al., "Error Control Coding", $2^{nd}$ Edition, Pearson Prentice Hall, 2004.

IEEE Draft Amendment to IEEE Standard for Information Technology Telecommunications and information exchange between systems—local and metropolitan area networks Specific requirements part. 15.3c: Wireless Medium Access Control (MAC) and Physical Layer (PHY) Specifications for High Rate Wireless Personal Area Networks (WPANs): Amendment 2: "Millimeter-wave based Alternative Physical Layer Extension" IEEE P.802.15c/D01, 2008.

IP Australia, "Patent Examination Report No. 1" in application No. 2010281296, dated May 15, 2014, 5 pages.

Current Claims in Australia application No. 2010281296, dated May 2014, 3 pages.

* cited by examiner

SOFT-DEMAPPING OF QAM SIGNALS

TECHNICAL FIELD

This invention concerns soft-decision demapping of Quadrature Amplitude Modulation (QAM) signals to enable soft-decision channel decoding in a communications system. In a first aspect the invention is a method for performing the soft-decision demapping. In other aspects the invention concerns a device for performing the method and software for performing the method.

Communications systems generally employ a channel encoder and a modulator in the transmitter. Bit Interleaved Coded Modulation (BICM) is an attractive compromise between power and spectrum efficiency and decoder complexity. The decoupling of the modulation and channel coding in a BICM scheme also allows the flexibility to select from a wider class of binary error-control codes and more flexibility in coding rate adaptation by puncturing. Quadrature Amplitude Modulation (QAM) in rectangular (R-QAM) and square (S-QAM) constellation is used in many communication systems. The channel encoder could be a convolutional coder, or might use other binary codes such as Turbo codes and LDPC codes or concatenated codes.

BACKGROUND ART

The channel capacity C, in bits per second (bps), of a wireless channel with bandwidth B in Hz can be represented [1] by $$C = B \log_2(1+\text{SNR}) \quad (1)$$

where SNR is the Signal to Noise Ratio experienced by the Receiver.

Capacity boosting by increasing power is unattractive since the capacity improves only logarithmically with the signal to noise ratio. Practically there exist many hardware impairments in the transceiver that create a signal to noise ratio floor which cannot be further improved by increasing the transmitter power. The impairments include oscillator phase noise, timing jitter, non-linearity, residue carrier and sampling frequency offsets between the transmitter and the receiver and the imbalance between the In-phase and Quadrature (I/Q) channels.

Another way to increase the channel capacity, according to (1), is to increase the signal bandwidth B. However, the spectrum is also a precious resource which has to be wisely shared among many users.

Simple modulation schemes such as Binary Phase Shift Keying (BPSK) is power efficient, but spectrum inefficient. To increase the spectrum efficiency, multi-level schemes such as QAM are more desirable. Orthogonal frequency division multiplexing (OFDM) is another spectrum efficient technique. OFDM divides the total signal spectrum into multiple sub-carriers (or tones) without any guard bands in between. Each sub-carrier is independently modulated so that their spectra overlap but the modulated sub-carrier signals are still orthogonal to each other [2].

In practice, the receiver has to deal with the Inter-Symbol Interference (ISI) caused by multi-path propagation, and filtering in the transmitter and receiver to extract the signal data, a process conventionally called 'equalization'. With the inclusion of a Cyclic Prefix (CP), OFDM transforms an ISI channel into an ISI-free channel in the frequency-domain, significantly simplifying the equalization complexity. OFDM's insensitivity to small timing-offset reduces the need for over-sampling and fine timing tracking.

Bit Interleaved Coded Modulation (BICM) is an attractive compromise between power and spectrum efficiency and decoder complexity [3]. BICM performs similarly to optimal Trellis Coded Modulation (TCM) with simpler decoder complexity. The decoupling of the modulation and channel coding in a BICM scheme also allows the flexibility to select from a wider class of binary error-control codes and more flexibility in coding rate adaptation. For the above reasons, the BICM scheme with QAM OFDM is adopted in many of the current standards and specifications (e.g. [4]).

It is established that soft-decision decoding (SDD) outperforms the hard-decision decoding (HDD). The SDD requires bit log-likelihood ratio (LLR) to be calculated from the received QAM signal. Optimal bit LLR calculation of QAM signals, has been addressed by [5]. To avoid the complexity of optimal LLR calculation, several authors have proposed the approximate LLR calculation based on the Max Log concept [6], [7], [8] and [9].

In gigabit radio systems, such as the specification defined in [4], $5.992 \times 10^9$ or more bit-LLRs have to be calculated in each second. Minimizing the complexity of these calculations is essential in a low-power and low-cost device. In practice, some processing has to be performed by the receiver before LLR can be calculated. In single-carrier (SC) receivers this processing may involve equalization. In OFDM receivers this processing may involve fast Fourier transform (FFT). For both SC and OFDM receivers, the processing creates simple channel models. Let $s_n(i)$ be the transmitted value at subcarrier n of OFDM symbol i. The corresponding value $z_n(i)$ at the FFT output can be represented by $$z_n(i) = s_n(i) h_n(i) + \eta_n(i),$$

where $h_n(i)$ is the channel gain and $\eta_n(i)$ is the noise and interference component. The above simple channel model equally applies to SC receivers by treating SC modulation as a special OFDM with only one subcarrier such that n=1.

No account has been given to the impact of channel estimation (CE) error [10]. The approximate LLRs proposed by Tosato and Bisaglia [11] were identified as the simplest class of high-performance algorithms currently known. The methods in this invention are much simpler than any of the prior arts. Additionally the invention addresses the issues in soft de-mapping rectangular QAM signals where the signal strength on I and Q channels are different, while the prior arts primarily apply to square QAM signals where the I and Q signal strengths are equal.

DISCLOSURE OF THE INVENTION

In a first aspect the invention is a method for soft-decision demapping of Quadrature Amplitude Modulation (QAM) signals to enable soft-decision channel decoding in a communications system, comprising the steps of:

Extracting baseband signals from both I-and-Q channels.

Sampling the baseband signals to extract a stream of complex numbers.

Converting the stream of complex numbers to frequency domain vectors with components for each subcarrier frequency.

Approximating bit log-likelihood ratios for each symbol directly from the real and imaginary parts of the corresponding frequency vector, without equalisation by the estimated channel. And, Soft-decoding of the channel codes using the approximated log-likelihood ratios.

The method is equally applicable to a generic bit-interleaved Orthogonal Frequency Division Multiplexing (OFDM) modulation for both square QAM (S-QAM) and R-QAM constellations in single-carrier and multi-carrier systems.

The channel coding may employ binary error-control codes or the concatenation of convolutional and Reed-Solomon (RS) codes. The method reduces computational complexity, which leads to lower power and lower cost.

The approximates of the bit log-likelihood ratios (LLRs) may be derived by decomposing the optimum LLR as a superposition of a linear function and a nonlinear function of the frequency domain vectors, and the linear part is then directly mapped to the approximate LLR.

In particular for quaternary phase shift keying (QPSK) the log likelihood ratios (LLR's) of bits $b_0$ and $b_1$ which are denoted by $\hat{b}_0$ and $\hat{b}_1$ are defined as follows:

$\hat{b}_0$ depends only on $a_n$, while
$\hat{b}_1$ depends only on $c_n$ where $a_n$ and $c_n$ are calculated from the corresponding frequency domain vector $z_n$ and the estimated channel $\tilde{h}_n$ as follows:

$$a_n = Re(\tilde{h}_n)Re(z_n) + Im(\tilde{h}_n)Im(z_n)$$

$$c_n = Re(\tilde{h}_n)Im(z_n) - Im(\tilde{h}_n)Re(z_n)$$

More particularly the approximated LLR is given by:

$$\hat{b}_0 = \frac{a_n}{\sigma_n^2}$$

$$\hat{b}_1 = (d_2/d_1)\frac{c_n}{\sigma_n^2}$$

where:
$\sigma_n^2$ is the noise variance in $z_n$; and
$d_1$ and $d_2$ are the constellation amplitude in $b_0$ and $b_1$ respectively In the case where:
the noise variance $\sigma_n^2$ is constant across all OFDM subcarriers and symbols; and
$d_1$ and $d_2$ are equal, that is square QPSK with equal error protection (EEP), then the optimum LLR is given by:

$$\hat{b}_0 = a_n$$

$$\hat{b}_1 = c_n$$

In particular for 16QAM constellation, the approximate bit LLR's $\hat{b}_0$, $\hat{b}_1$, $\hat{b}_2$ and $\hat{b}_3$ are given by:

$$\hat{b}_0 \approx \frac{1}{\sigma_n^2} a_n$$

$$\hat{b}_1 \approx \frac{2d_1|\tilde{h}_n|^2 - |a_n|}{\sigma_n^2}$$

$$\hat{b}_2 \approx \frac{d_2/d_1}{\sigma_n^2} c_n$$

$$\hat{b}_3 \approx \frac{2(d_2^2/d_1)|\tilde{h}_n|^2 - (d_2/d_1)|c_n|}{\sigma_n^2}$$

where:
where $a_n$ and $c_n$ are calculated from the corresponding frequency domain vector $z_n$ and the estimated channel $\tilde{h}_n$ as follows:

$$a_n = Re(\tilde{h}_n)Re(z_n) + Im(\tilde{h}_n)Im(z_n)$$

$$c_n = Re(\tilde{h}_n)Im(z_n) - Im(\tilde{h}_n)Re(z_n)$$

$\sigma_n^2$ the noise variance in $z_n$; and
$d_1$ and $d_2$ are the constellation amplitude in I-channel and Q-channel respectively.

In the case where:
the noise variance $\sigma_n^2$ is constant across all OFDM subcarriers and symbols; and
$d_1$ and $d_2$ are equal (both can be assumed to be 0.5), that is square 16QAM with equal error protection (EEP), then the optimum LLR is given by:

$$\hat{b}_0 = a_n$$

$$\hat{b}_1 = |\tilde{h}_n|^2 - |a_n|$$

$$\hat{b}_2 = c_n|$$

$$\hat{b}_3 = |\tilde{h}_n|^2 - |c_n|$$

It will be appreciated that no explicit equalisation operation is required to derive the LLR's since they are derived directly from the frequency domain vectors output from the FFT. In contrast, the prior arts equalize the FFT output by dividing each subcarrier output by its channel estimate before LLRs are calculated.

The approximate LLR's effectively performs equally well as the optimum LLR on an Additive White Gaussian Noise (AWGN) channel.

The 16QAM LLRs $\hat{b}_0$ and $\hat{b}_2$ is identical to the QPSK LLR $\hat{b}_0$ and $\hat{b}_1$, allowing for the re-use of a common circuit. Also the 16QAM LLRs $\hat{b}_1$ and $\hat{b}_3$ cane easily obtained from the LLRs $\hat{b}_0$ and $\hat{b}_2$.

In another aspect the invention is a programmed device for performing the method, comprising:

A radio frequency demodulator to convert the received signal into a baseband signal on both I and Q channels.

An analogue to digital converter to sample the I/Q baseband signals to create a stream of complex numbers.

A Time SYNC block to determine the OFDM Symbol Boundary, and an estimate of the carrier frequency offset.

A phase shifter to perform frequency correction.

A Fourier Transformer to generate a frequency domain vector:

A log likelihood ratio (LLR) block to calculate the LLR of each interleaved bit using the formulas of the method.

In a further aspect the invention is a software program, for instance in machine readable form on a machine readable medium, for performing the method.

The invention can also soft-demap at the output of a conventional single-carrier equalizer for channels with ISI or a flat channel without ISI.

The approximate LLR can be easily extended to R-QAM and S-QAM with larger constellation sizes such as 64QAM and 256QAM etc using the known techniques [15]. When the pulse amplitude modulation (PAM) decomposition is used to calculate the LLR, it is obvious that the number of levels of the PAM on the I-channel does not have to be the same as that of the Q-channel.

BRIEF DESCRIPTION OF THE DRAWINGS

An example of the invention will now be described with reference to the accompanying drawings, in which:

FIG. 3(*a*) is a graph of the signal constellation of 16QAM; and

FIG. 3(*b*) is a graph of the signal constellation of 4PAM in I-channel and 4PAM in Q-channel.

FIG. 3(*c*) is the rectangular constellation of a QPSK signal.

BEST MODES OF THE INVENTION

Transmitter Specification

Figure 1:
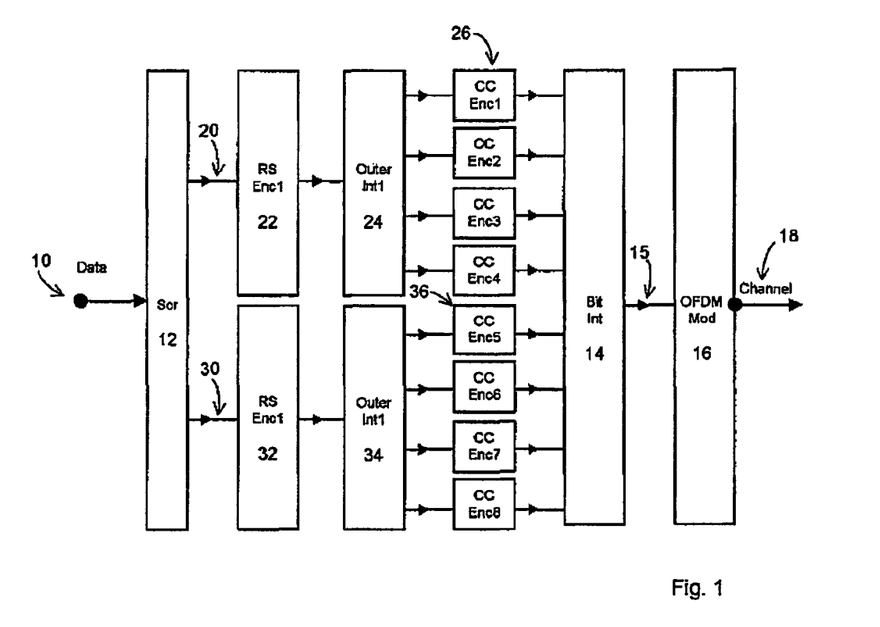
FIG. 1 is a block diagram of transmitter signal processing.

Referring first to FIG. 1, Data 10 at the rate of up to 3.8 Gbps, from a service access point between the physical and medium access control layers, is scrambled by a scrambler 12, and split into two bit streams 20 and 30. Each bit stream is encoded by an Reed Solomon (RS) encoder 22, 32. Each RS encoder encodes 216 octets into 224 octets, shortened from an RS (255, 247) code and each element of the code is an octet wide. Each outer Interleaver 24, 34 is a 224×4 block interleaver where four RS codewords are filled into the columns and read out in the order of rows by four convolutional code Encoders, 26 and 36. Each convolutional code encoder is based on a rate-⅓ and constraint-7 code, punctured to the rate of: ⅓, 4/7, ⅔ and ⅘. The outputs of all eight Convolution Code encoders are multiplexed into a bit interleaver 14. The output of the bit interleaver 14 is organized in blocks by an OFDM modulator 16 for onward transmission over the channel 18. Each block contains the exact number of bits of one OFDM symbol.

This system design splits the channel coding load in the transmitter and the channel decoding load in the receiver into eight parallel convolutional codecs 26, 36 and two RS codecs 22, 32. Without this parallel scheme, a single codec would have to run at a much higher clock rate, which would be less feasible with the current manufacturing technology.

Figure 2:
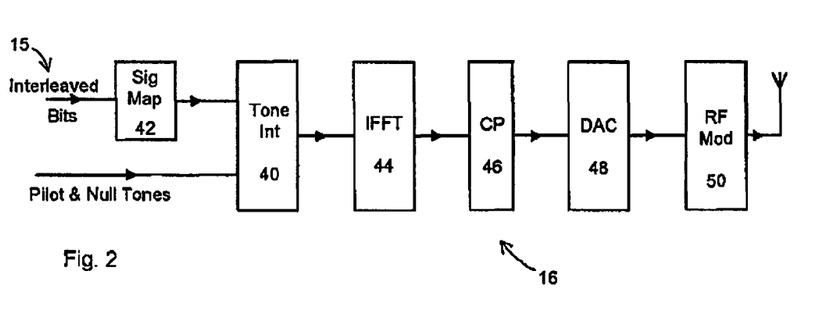
FIG. 2 is a block diagram of the OFDM modulator of FIG. 1.

The components of the OFDM Modulator 16 in FIG. 1 are shown in FIG. 2. A tone interleaver 40 dynamically changes the locations of the pilot and data subcarriers from symbol to symbol and maintains the Null tones at the fixed locations. The output of the tone interleaver 40 corresponding to OFDM symbol i is denoted by S(i):

$$S(i)=[s_1(i), s_2(i), \ldots, s_{511}(i), s_{512}(i)], \quad (2)$$

where $s_n(i)$ is a complex number representing the signal value at subcarrier n;

$s_1(i)$ to $s_{336}(i)$ are the data signals, $s_{337}(i)$ to $s_{352}(i)$ are the pilots and $s_{353}(i)$ to $s_{512}(i)$ are the Null tones.

The Signal Mapper 42 maps the interleaved bits into either a Quaternary Phase Shift Keying (QPSK) or 16QAM constellation.

$$s_n(i) \in \begin{cases} QPSK/16QAM & 1 \leq n \leq 336 \\ BPSK & 337 \leq n \leq 352 \\ 0 & 353 \leq n \leq 512. \end{cases} \quad (3)$$

The reference sampling rate is $f_s$=2.538 Gsps. Out of the 160 Null subcarriers, 3 are put around the DC and 157 in the guard bands towards the boundary of the frequency channel whose bandwidth is 2.16 GHz. Each OFDM symbol carries 672 interleaved bits for QPSK or 1344 bits for 16QAM.

Figure 3:
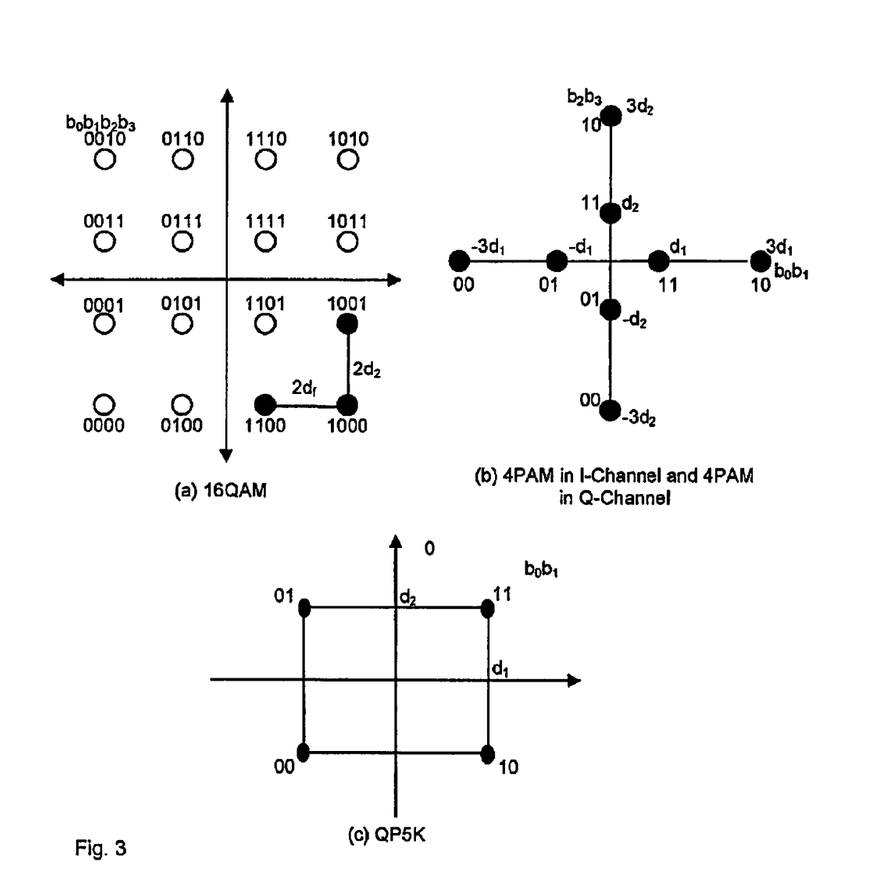

Gray-coding is used to map the interleaved bits to the 16QAM constellation as shown in FIG. 3(*a*). FIG. 3(*b*) illustrates the equivalence between 16QAM and the superposition of two Gray-coded 4-level Pulse Amplitude Modulation (4PAM): one on the I-channel and one on the Q-channel. This equivalence will be used later to simplify the LLR estimation. FIG. 3(*c*) illustrates the rectangular constellation of a QPSK signal. The pilot tones are always in BPSK format and the Null tones are always set to zero. The QAM constellation can be used for Equal Error Protection (EEP) ($d_1=d_2$) and Unequal Error Protection (UEP) ($d_1 \neq d_2$).

The Inverse Fast Fourier Transform 44 can be represented by a function $f_{IFFT}(S(i))$, and transforms the frequency-domain vector S(i) into a time-domain vector U(i):

$$U(i)=f_{IFFT}(S(i))=[u_1(i), u_2(i), \ldots, u_{511}(i), u_{512}(i)]. \quad (4)$$

A cyclic prefix of length sixty four samples 46 is then added to the output of the IFFT, creating a vector V(i):

$$V(i) = [v_1(i), v_2(i), \ldots, v_{575}(i), v_{576}(i)], \quad (5)$$

$$v_n(i) = \begin{cases} u_{n+448}(i) & 1 \leq n \leq 64 \\ u_{n-64}(i) & 65 \leq n \leq 576. \end{cases} \quad (6)$$

The vector V(i) represents a full OFDM symbol, carrying the maximum coded data rate of 5.922 Gbps. The Digital to Analogue Converter 48 then transforms the digital vector V(i) into an analogue baseband signal, which is then converted to the Radio Frequency channel and transmitted by the RF modulator 50.

Figure 4:
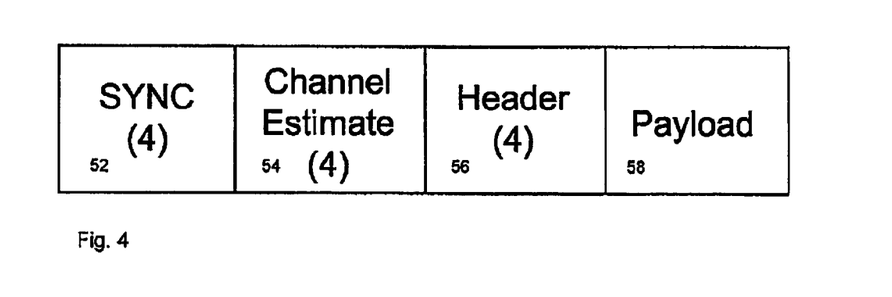
FIG. 4 is a diagram of the packet format.

The PHY packet format is shown in FIG. 4. The packet starts with the fields of SYNC 52, channel estimate 54 and header 56, each lasting a period of four OFDM symbols, followed by the payload 58. The SYNC signal 52 is a repetition of time-domain M-sequence for the receiver to detect the beginning of the packet, and to estimate the carrier frequency offset. The channel estimate field consists of frequency-domain BPSK pilots for the receiver to estimate the channel frequency response. The header, including the physical header, medium access control header and header check sequence, is QPSK-modulated and protected by a ⅓-rate convolutional code. The Payload can be either QPSK or 16QAM modulated, depending on the mode of operation.

Receiver Architecture

Figure 5:
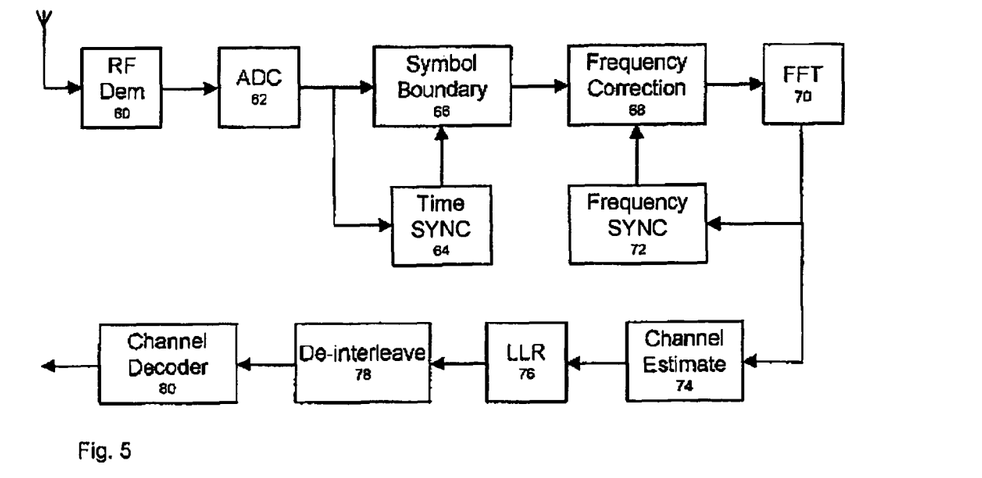
FIG. 5 is a block diagram of receiver architecture.

The receiver architecture is shown in FIG. 5. The radio frequency demodulator 60 converts the RF signal into a baseband signal on both I and Q channels. The analogue to digital converter 62 samples the I/Q baseband signals at the rate of 2.538 Gsps to create a stream of complex numbers.

The Time SYNC block 64 processes the received SYNC signal to determine the beginning of a packet. The Time SYNC result therefore provides the OFDM Symbol Boundary 66. The 512 received samples representing the transmitted vector U(i) are denoted by another vector W(i):

$$W(i)=[w_1(i), w_2(i), \ldots, w_{511}(i), w_{512}(i)]. \quad (7)$$

The Time SYNC also provides an estimate of the carrier frequency offset $\Delta \tilde{f}_c(i)$. Frequency correction 68 is then performed by shifting the phase of each element of the vector W(i). The carrier frequency compensated vector X(i) is represented as follows.

$$X(i)=[x_1(i),x_2(i),\ldots,x_{511}(i),x_{512}(i)], \quad (8)$$

$$x_n(i)=w_n(i)e^{-j[\tilde{\theta}_0(i)+2\pi\Delta\tilde{f}_c(i)nT_s]}, \quad (9)$$

where $T_s=1/f_s \approx 3.94\times 10^{-8}$ seconds, and $\tilde{\theta}_0(i)$ is the initial phase, which needs to be estimated for each OFDM symbol.

Among other things, $\tilde{\theta}_0(i)$ will account for the phase shift due to uncompensated residue carrier frequency error and the common phase error caused by phase noise [12]. Fast Fourier Transform 70 (FFT), denoted by the function $f_{FFT}$, is then performed on vector X(i) to generate a frequency domain vector Z(i):

$$Z(i)=f_{FFT}(X(i))=[z_1(i),z_2(i),\ldots,z_{511}(i),z_{512}(i)]. \quad (10)$$

For each new OFDM symbol i, the frequency SYNC block 72 estimates and updates the $\Delta\tilde{f}_c(i)$ and $\tilde{\theta}_0(i)$, and the channel estimate block 74 computes the channel gain $\tilde{H}(i)$ for each data subcarrier:

$$\tilde{H}(i)=[\tilde{h}_1(i),\tilde{h}_2(i),\ldots,\tilde{h}_{335}(i),\tilde{h}_{336}(i)]. \quad (11)$$

The log likelihood ratio (LLR) block 76 calculates the LLR of each interleaved bit. The calculated LLRs are de-interleaved 78 and used by the channel decoder 80. The decoding algorithms for convolutional codes and the Reed Solomon codes are well known [13].

Soft Demapping of R-QAM Signals

Figure 6:
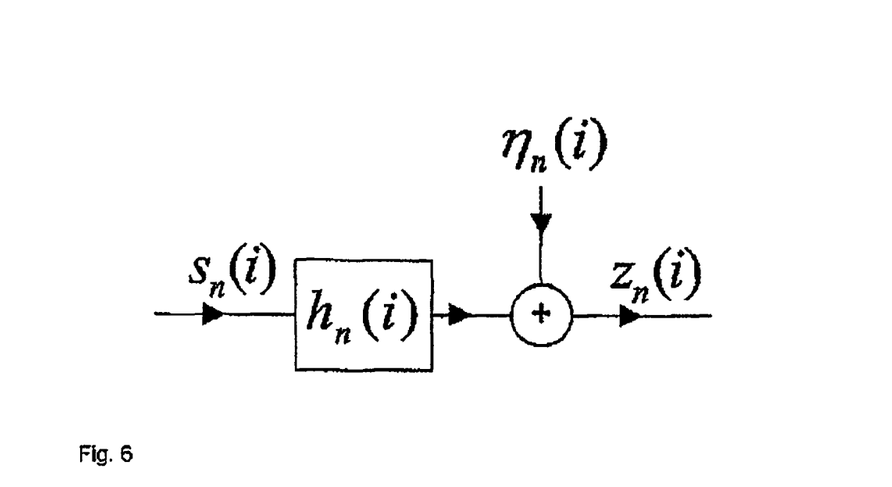
FIG. 6 is a formula representing the signal model at the FFT output.

The FFT 70 operation in an OFDM demodulator transforms a time-domain channel with inter-symbol interference into a frequency-domain channel with a single-tap channel gain on each subcarrier. After frequency correction 68, the received frequency-domain data can be simply modelled as shown in FIG. 6. The value $s_n(i)$ is transmitted at subcarrier n of OFDM symbol i. The corresponding value $z_n(i)$ at the FFT output can be represented by:

$$z_n(i)=s_n(i)h_n(i)+\eta_n(i), \quad (12)$$

where $h_n(i)$ is the channel gain and $\eta_n(i)$ is the noise and interference component.

Each variable in (12) is a complex number. $\eta_n(i)$ is a zero-mean Gaussian random variable whose average energy is denoted by $\sigma_n^2(i)$. The signal to noise ratio in dB experienced by the receiver is defined as:

$$SNR(dB) = 10\log_{10}\frac{\sum_{i=1}^{\infty}\sum_{n=1}^{512}|s_n(i)h_n(i)|^2}{\sum_{i=1}^{\infty}\sum_{n=1}^{512}\sigma_n^2(i)}. \quad (13)$$

We now derive the log-likelihood ratio for QPSK and 16QAM. Since we only focus on a particular symbol i, the dependence on i is omitted from the formulas to save space.

Conventionally the LLR is calculated in two steps [11]. First the FFT 70 output value $z_n$ is equalized by the estimated channel $\tilde{h}_n$ to obtain the equalized value $y_n$, and the equalized value $y_n$ is then used in the LLR calculation as in [5], [6], [7], [8] and [9].

We will show that the division by $|\tilde{h}_n|^2$ as in (14) is unnecessary, and the omission of it results in a significant complexity reduction.

$$y_n = \frac{z_n}{\tilde{h}_n} = \frac{\alpha_n + jc_n}{|\tilde{h}_n|^2} = \frac{a_n + jc_n}{\mathrm{Re}^2(\tilde{h}_n) + \mathrm{Im}^2(\tilde{h}_n)}, \quad (14)$$

$$a_n = \mathrm{Re}(\tilde{h}_n)\mathrm{Re}(z_n) + \mathrm{Im}(\tilde{h}_n)\mathrm{Im}(z_n), \quad (15)$$

$$c_n = \mathrm{Re}(\tilde{h}_n)\mathrm{Im}(z_n) - \mathrm{Im}(\tilde{h}_n)\mathrm{Re}(z_n). \quad (16)$$

QPSK

The mapping from the bits $b_0$ and $b_1$, each taking the value of 0 or 1, to a QPSK symbol is as follows.

$$QPSK=(2b_0-1)d_1+j(2b_1-1)d_2 \quad (17)$$

If we had performed the equalization as in (14), the noise variance $\gamma_n^2$ in $y_n$ would have been:

$$\gamma_n^2=\sigma_n^2/|\tilde{h}_n|^2. \quad (18)$$

The I/Q signals would have been de-correlated so that the LLR of $b_0$, denoted by $\tilde{b}_0$, depends only on $\mathrm{Re}(y_n)$, while the LLR $\tilde{b}_1$ only on $\mathrm{Im}(y_n)$:

$$\tilde{b}_0 = \frac{1}{4d_1}\ln\frac{e^{-(Re(y_n)-d_1)^2/\gamma_n^2}}{e^{-(Re(y_n)+d_1)^2/\gamma_n^2}} \quad (19)$$

$$\tilde{b}_1 = \frac{1}{4d_1}\ln\frac{e^{-(Im(y_n)-d_2)^2/\gamma_n^2}}{e^{-(Im(y_n)+d_2)^2/\gamma_n^2}}.$$

By applying (14)-(16) and (18) into (19), we can easily obtain:

$$\tilde{b}_0 = \frac{\alpha_n}{\sigma_n^2} \quad (20)$$

$$\tilde{b}_1 = (d_2/d_1)\frac{c_n}{\sigma_n^2}.$$

In the case of EEP (i.e. $d_1=d_2$), the coefficient $d_2/d_1$ in (20) can be dropped. Additionally, if the noise variance $\sigma_n^2$ at the FFT output can be assumed to be a constant across all OFDM symbols that influence a channel codeword and across all subcarriers of an OFDM symbol, the optimum LLR $\hat{b}_0$ and $\hat{b}_1$ can be calculated as follows, which does not require the estimate of noise variance.

$$\hat{b}_0=a_n$$

$$\hat{b}_1=c_n$$

16QAM

Use the same argument as in the case of QPSK, the bit LLRs of a 16QAM constellation, $\tilde{b}_0$, $\tilde{b}_1$, $\tilde{b}_2$ and $\tilde{b}_3$, can be calculated as follows.

$$\tilde{b}_0 = \frac{1}{4d_1}\ln\frac{e^{-(Re(y_n)-d_1)^2/\gamma_n^2}+e^{-(Re(y_n)-3d_1)^2/\gamma_n^2}}{e^{-(Re(y_n)+d_1)^2/\gamma_n^2}+e^{-(Re(y_n)+3d_1)^2/\gamma_n^2}} \quad (22)$$

$$\tilde{b}_1 = \frac{1}{4d_1}\ln\frac{e^{-(Re(y_n)-d_1)^2/\gamma_n^2}+e^{-(Re(y_n)-d_1)^2/\gamma_n^2}}{e^{-(Re(y_n)+3d_1)^2/\gamma_n^2}+e^{-(Re(y_n)+3d_1)^2/\gamma_n^2}}$$

$$\tilde{b}_2 = \frac{1}{4d_1}\ln\frac{e^{-(Im(y_n)-d_2)^2/\gamma_n^2}+e^{-(Im(y_n)-3d_2)^2/\gamma_n^2}}{e^{-(Im(y_n)+d_2)^2/\gamma_n^2}+e^{-(Im(y_n)+3d_2)^2/\gamma_n^2}}$$

$$\tilde{b}_3 = \frac{1}{4d_1}\ln\frac{e^{-(Im(y_n)-d_2)^2/\gamma_n^2}+e^{-(Im(y_n)-d_2)^2/\gamma_n^2}}{e^{-(Im(y_n)+3d_2)^2/\gamma_n^2}+e^{-(Im(y_n)+3d_2)^2/\gamma_n^2}}.$$

By applying (14)-(16) into (22) and with some algebra manipulation we can have:

$$\tilde{b}_0 = \frac{1}{\sigma_n^2} a_n + \delta_{b0} \quad (23)$$

$$\tilde{b}_1 = \frac{2d_1|\tilde{h}_n|^2 - a_n}{\sigma_n^2} + \delta_{b1}$$

$$\tilde{b}_2 = \frac{d_2/d_1}{\sigma_n^2} c_n + \delta_{b2}$$

$$\tilde{b}_3 = \frac{2d_2^2/d_1|\tilde{h}_n|^2 - (d_2/d_1)c_n}{\sigma_n^2} + \delta_{b3},$$

$$\delta_{b0} = \frac{1}{4d_1} \ln \frac{1 + e^{\frac{4d_1}{\sigma_n^2}(a_n - 2d_1|\tilde{h}_n|^2)}}{1 + e^{\frac{4d_1}{\sigma_n^2}(a_n - 2d_1|\tilde{h}_n|^2)}} \quad (24)$$

$$\delta_{b1} = \frac{1}{4d_1} \ln \frac{1 + e^{\frac{-4d_1}{\sigma_n^2} a_n}}{1 + e^{\frac{-12d_1}{\sigma_n^2} a_n}}$$

$$\delta_{b2} = \frac{1}{4d_1} \ln \frac{1 + e^{\frac{4d_2}{\sigma_n^2}(c_n - 2d_2|\tilde{h}_n|^2)}}{1 + e^{\frac{-4d_2}{\sigma_n^2}(c_n + 2d_2|\tilde{h}_n|^2)}}$$

$$\delta_{b3} = \frac{1}{4d_1} \ln \frac{1 + e^{\frac{-4d_2}{\sigma_n^2} c_n}}{1 + e^{\frac{-12d_2}{\sigma_n^2} c_n}}.$$

We have shown that all optimum bit LLRs can be decomposed into the sum of a linear and a nonlinear function. In contrast, the LLR $\tilde{b}_1$ and $\tilde{b}_3$ in [5] were decomposed into a constant and a non-linear function. The advantage of the decomposition (23) is that the linear part can be adopted as approximate LLRs. By considering the symmetry of the LLR, the following approximate LLRs can be obtained.

$$\tilde{b}_0 \approx \frac{1}{\sigma_n^2} a_n \quad (25)$$

$$\tilde{b}_1 \approx \frac{2d_1|\tilde{h}_n|^2 - |a_n|}{\sigma_n^2}$$

$$\tilde{b}_2 \approx \frac{d_2/d_1}{\sigma_n^2} c_n$$

$$\tilde{b}_3 \approx \frac{2(d_2^2/d_1)|\tilde{h}_n|^2 - (d_2/d_1)|c_n|}{\sigma_n^2}$$

Furthermore, under the conditions that $d_1=d_2=0.5$ (as long as $d_1=d_2$ and without loss of any generality, the receiver can assume a square 16QAM constellation of arbitrary scale. The value of 0.5 is chosen to minimize the algorithm complexity.) and the noise $\sigma_n^2$ is a constant, the approximate LLRs $\hat{b}_0$, $\hat{b}_1$, $\hat{b}_2$ and $\hat{b}_3$ become:

$$\hat{b}_0 = a_n$$

$$\hat{b}_1 = |\tilde{h}_n|^2 - |a_n|$$

$$\hat{b}_2 = c_n$$

$$\hat{b}_3 = |\tilde{h}_n|^2 - |c_n|$$

Complexity Analysis

We analyse the complexity by comparing the number of additions (+), subtractions (−), multiplications (*), divisions (/) and modulus (||), which is used to implement (26). As a reference, we only consider $\hat{b}_0$ and $\hat{b}_1$. To calculate $\hat{b}_0$ (or $a_n$), 2 multiplications and 1 addition are needed. We need 2 multiplications and 1 addition for obtaining $|\tilde{h}_n|^2$. In addition, 1 subtraction and 1 modulus are needed to calculate $\hat{b}_1$. Therefore, a total of 4 multiplications, 2 additions, 1 subtraction and 1 modulus is needed.

The Tosato-Bisaglia Demapper (TBD) [11] in its simplest form requires 2 additional multiplications and 1 additional division for every two interleaved bits. The divider in TBD is particularly undesirable as it is expensive to implement and prone to round-off errors.

The complexity comparison in shown in the following Table:

| Operations Needed for | + | − | * | / | \|\| |
|---|---|---|---|---|---|
| $\hat{b}_0$ and $\hat{b}_1$ | 2 | 1 | 4 |   | 1 |
| $\hat{b}_0$ and $\hat{b}_1$ (TBD) | 2 | 1 | 6 | 1 | 1 |

Simulation Results

Figure 7:
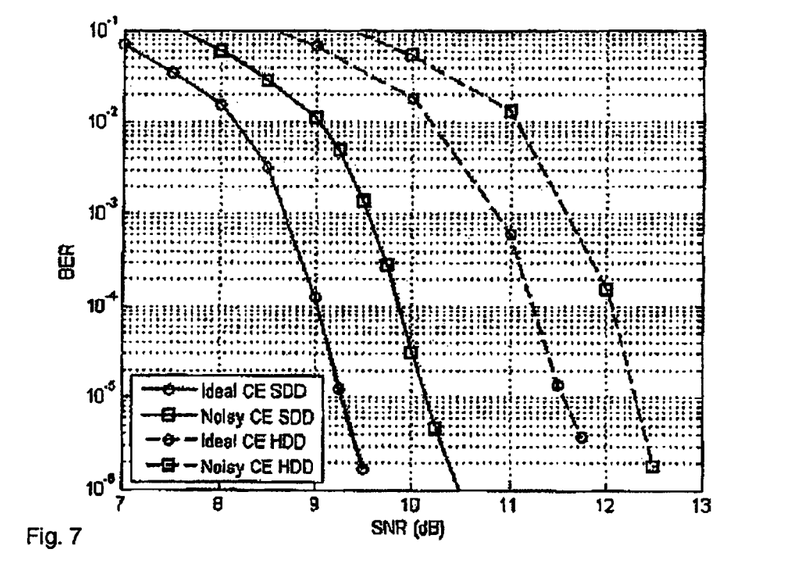
FIG. 7 is a graph showing the Bit Error Rate (BER) on an additive white gaussian noise (AWGN) channel with ideal and noisy channel estimate.
Figure 8:
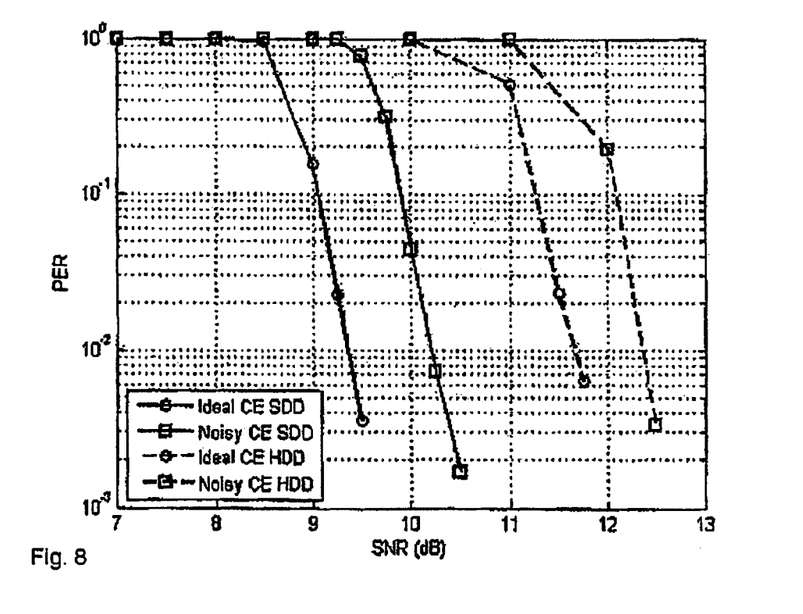
FIG. 8 is a graph showing the Packet Error Rate (PER) on an additive white gaussian noise (AWGN) channel with ideal and noisy channel estimate.

The Bit Error Rate (BER) and Packet Error Rate (PER) on an additive white gaussian noise channel (AWGN) are shown in FIGS. 7 and 8, for the comparison of soft-decision decoding and hard-decision decoding. Both ideal channel estimation and noisy channel estimation are used for the evaluation. The noisy estimation is based on the actual estimated value from the channel estimate field of the packet shown in FIG. 4. We omitted the performance curves for SDD using the optimum LLR as they are visually the same as that of the approximate LLR. As expected [13], the performance difference between SDD and HDD is slightly more than 2 dB on an AWGN channel. It is well known that the performance difference between SDD and HDD on multi-path frequency-selective fading channels is well above 3 dB [11].

The invention may be applied to demapping in:
OFDM systems.
Rectangular as well as square QAM signals.
Single-carrier modulation on flat fading channels.
Single-carrier modulation on channels with intersymbol interference.
QAM signals where there are a different number of bits transmitted on the I- and -Q channels;
And where Convolutional codes or other binary error-control codes are used.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

REFERENCES

The contents of the following documents are incorporated herein by reference:
[1] J. Proakis, "Digital Communications," 4<sup>th</sup> Edition, McGraw-Hill, 2001.
[2] Y. Li, and G. Sather (Eds.), "Orthogonal Frequency Division Multiplexing for Wireless Communications," Springer 2006.
[3] G. Caire, G. Taricco and E. Biglieri, "Bit-interleaved coded modulation," *IEEE Trans. Inform. Theory*, Vol. 44, No. 3, pp. 927-946, May 1998.
[4] Amendment 2: "Millimeter-wave based Alternative Physical Layer Extension," *IEEE P802.15.3c/D01*, 2008.

[5] M. Simon and R. Annavajjala, "On the optimality of bit detection of certain digital modulations," *IEEE Trans. Commun.*, Vol. 53, No. 2, pp. 299-307, February 2005.

[6] M. Raju, R. Annavajjala, and A. Chockalingam, "BER Analysis of QAM on Fading Channels with Transmit Diversity," *IEEE Trans. Wireless Commun.*, Vol. 5, NO. 3, pp. 481-486, March 2006.

[7] L. Szczecinski, R. Bettancourt and R. Feick, "Probability Density Function of Reliability Metrics in BICM with Arbitrary Modulation: Closed-form through Algorithmic Approach," *IEEE Trans. Commun.*, Vol. 56, NO. 5, pp. 736-742, May 2008.

[8] K. Kim, K. Hyun, C. Yu, Y. Park, D. Yoon and S. Park, "General Log-Likelihood Ratio Expression and Its Implementation Algorithm for Gray-Coded QAM Signals," *ETRI Journal*, Vol. 28, No. 3, pp. 291-300, June 2006.

[9] A. Natalin and A. Sergienko, "The Method of Theoretic Estimation of BER of ML Receiver for Binary Coded Systems with Square QAM," *IEEE International Conf. on Commun.*, No. 1, pp. 1192-1197, June 2006.

[10] M. Wang, W. Xiao and T. Brown, "Soft decision metric generation for QAM with channel estimation error," *IEEE Trans. Commun.*, Vol. 50, No. 7, pp. 1058-1061, July 2002.

[11] F. Tosato and P. Bisaglia, "Simplified soft-output demapper for binary interleaved COFDM with application to HIPERLAN/2," *IEEE International Conf. on Commun.*, Vol. 2, pp. 664-668, April/May 2002.

[12] T. Pollet, M. V. Bladel and M. Moeneclaey, "BER Sensitivity of OFDM Systems to Carrier Frequency Offset and Wiener phase noise," *IEEE Trans. Comunm.* Vol. 43, No. 2/3/4, pp. 191-193, February/March/April 1995.

[13] S. Lin and D. Costello, Jr. "Error Control Coding," $2^{nd}$ Edition, Pearson Prentice Hall, 2004.

[14] M. Ammari and F. Gagnon, "TCOFDM symbol detection: joint channel estimation and decoding," *IEEE International Conf. on Commun.*, No. 1, pp. 852-856, June, 2004.

[15] C. Chang, P. Chen and Y. Han, "A systematic bit-wise decomposition of M-ary symbol metric," *IEEE Trans. Wireless Commun.*, Vol. 5, No. 10, pp. 2742-2750, October 2006.

The invention claimed is:

1. A method for soft-decision demapping of Quaternary Phase Shift Keying (QPSK) signals to enable soft-decision channel decoding in a communications system, the method comprising the steps of:

extracting baseband signals from both in-phase (I) and quadrature (Q) phase channels;

sampling the baseband signals to extract a stream of complex numbers;

converting the stream of complex numbers to frequency domain vectors with components for each subcarrier frequency;

approximating bit log-likelihood ratios for each symbol directly from the real and imaginary parts of the corresponding frequency vector; and soft-decoding of the channel codes using the approximated bit log-likelihood ratios;

wherein the approximates of the log-likelihood ratios (LLRs) are derived by decomposing the optimum LLR as a superposition of a linear function and a nonlinear function of the frequency domain vectors, and the linear part is then directly mapped to the approximate LLR;

wherein for QPSK constellation the log likelihood ratios (LLR's) of bits $b_0$ and $b_1$ which are denoted by $\tilde{b}_0$ and $\tilde{b}_1$ are defined as follows:

$\tilde{b}_0$ depends only on $a_n$, while
$\tilde{b}_1$ depends only on $c_n$ where $a_n$ and $c_n$ is calculated from the corresponding frequency domain vector $z_n$ and the estimated channel $\tilde{h}_n$ as follows:

$$a_n = Re(\tilde{h}_n)Re(z_n) + Im(\tilde{h}_n)Im(z_n)$$

$$c_n = Re(\tilde{h}_n)Im(z_n) - Im(\tilde{h}_n)Re(z_n).$$

2. A method according to claim 1, wherein the approximated LLR is given by:

$$\tilde{b}_0 = \frac{a_n}{\sigma_n^2}$$

$$\tilde{b}_1 = (d_2/d_1)\frac{c_n}{\sigma_n^2}$$

where:
$\sigma_n^2$ is the noise variance in $z_n$; and
$d_1$ and $d_2$ are the constellation amplitude in $b_0$ and $b_1$ respectively.

3. A method according to claim 2, wherein the noise variance $\sigma_n^2$ is constant across all OFDM subcarriers and symbols; and there is equal error protection (EEP), then the optimum LLR is given by:

$$\hat{b}_0 = a_n$$

$$\hat{b}_1 = c_n.$$

4. A method for soft-decision demapping of 16Quadrature Amplitude Modulation (QAM) signals to enable soft-decision channel decoding in a communications system, the method comprising the steps of:

extracting baseband signals from both in-phase (I) and quadrature (Q) phase channels;

sampling the baseband signals to extract a stream of complex numbers;

converting the stream of complex numbers to frequency domain vectors with components for each subcarrier frequency;

approximating bit log-likelihood ratios for each symbol directly from the real and imaginary parts of the corresponding frequency vector; and soft-decoding of the channel codes using the approximated bit log-likelihood ratios;

wherein the approximates of the log-likelihood ratios (LLRs) are derived by decomposing the optimum LLR as a superposition of a linear function and a nonlinear function of the frequency domain vectors, and the linear part is then directly mapped to the approximate LLR;

wherein for 16QAM constellation the approximate bit LLR's $\tilde{b}_0$, $\tilde{b}_1$, $\tilde{b}_2$ and $\tilde{b}_3$ are given by:

$$\tilde{b}_0 \approx \frac{1}{\sigma_n^2} a_n$$

$$\tilde{b}_1 \approx \frac{2d_1|\tilde{h}_n|^2 - |a_n|}{\sigma_n^2}$$

$$\tilde{b}_2 \approx \frac{d_2/d_1}{\sigma_n^2} c_n$$

-continued $$\hat{b}_3 \approx \frac{2(d_2^2/d_1)|\tilde{h}_n|^2 - (d_2/d_1)|c_n|}{\sigma_n^2}$$

where $a_n$ and $c_n$ are calculated from the corresponding frequency domain vector $z_n$ and the estimated channel $\tilde{h}_n$ as follows:

$$a_n = Re(\tilde{h}_n)Re(z_n) + Im(\tilde{h}_n)Im(z_n)$$

$$C_n = Re(\tilde{h}_n)Im(z_n) - Im(\tilde{h}_n)Re(z_n);$$

$\sigma_n^2$ is the noise variance in $z_n$; and
$d_1$ and $d_2$ are the constellation amplitude in I-channel and Q-channel respectively.

5. A method according to claim 4, wherein the noise variance $\sigma_n^2$, is constant across all OFDM subcarriers and symbols; and there is equal error protection (EEP), then the optimum LLR is given by:

$$\hat{b}_0 = a_n$$

$$\hat{b}_1 = |\tilde{h}_n|^2 - |a_n|$$

$$\hat{b}_2 = c_n$$

$$\hat{b}_3 \approx |\tilde{h}_n|^2 - |c_n|.$$

* * * * *